United States Patent [19]

Francis et al.

[11] 4,450,860

[45] May 29, 1984

[54] DISCHARGE VALVE GUIDE

[75] Inventors: Woodie R. Francis; James F. Fogt, both of Sidney, Ohio

[73] Assignee: Copeland Corporation, Sidney, Ohio

[21] Appl. No.: 234,169

[22] Filed: Feb. 13, 1981

[51] Int. Cl.³ .............................................. F16K 15/02
[52] U.S. Cl. ................................ 137/543.19; 417/569
[58] Field of Search ........... 137/535, 536, 540, 543.13, 137/543.17, 543.21, 512, 543.19; 417/564, 567, 569

[56] References Cited

U.S. PATENT DOCUMENTS

| 310,459 | 1/1865 | Nicholson | 137/512.1 |
|---|---|---|---|
| 367,726 | 8/1887 | Penney | 417/454 |
| 512,369 | 1/1894 | Garis | 137/543.17 |
| 520,349 | 5/1894 | Zies | 137/512.2 |
| 542,083 | 7/1895 | De Laval | 137/512.1 |
| 955,822 | 4/1910 | Mayhew | 417/447 |
| 976,010 | 11/1910 | Thompson | 137/512.1 |
| 1,109,154 | 9/1914 | Thomas | 137/512.2 |
| 1,185,412 | 5/1916 | Kramer | 417/268 |
| 1,287,751 | 12/1918 | Richards | 137/512.1 |
| 1,407,518 | 2/1922 | Dennedy | 137/512 |
| 1,425,663 | 8/1922 | Lawhead | 417/567 |
| 1,467,445 | 9/1923 | Meyers | 137/454.4 |
| 1,476,794 | 12/1923 | Berry | 137/512.3 |
| 1,490,141 | 4/1924 | Stoms | 137/512.1 |
| 1,494,834 | 5/1924 | Hack | 137/454.4 |
| 1,514,233 | 11/1924 | Searles et al. | 123/188 S |
| 1,628,096 | 5/1927 | Worth | 417/567 |
| 1,652,978 | 12/1927 | Enock | 137/512.1 |
| 1,659,817 | 2/1928 | Halvorsen | 137/512 |
| 1,719,572 | 7/1929 | Stoll | 137/512.3 |
| 1,800,185 | 4/1931 | Thrush | 137/543.17 |
| 1,834,589 | 12/1931 | Holdsworth | 137/543.19 |
| 1,871,285 | 8/1932 | Tursky | 137/543.21 |
| 1,976,098 | 10/1934 | Smith | 417/566 |
| 1,985,841 | 12/1934 | Shepherd | 137/512.1 |
| 1,998,444 | 4/1935 | Clapp | 137/543.19 |

(List continued on next page.)

FOREIGN PATENT DOCUMENTS

| 144437 | 4/1950 | Australia . |
| 681798 | 3/1964 | Canada . |
| 452903 | 11/1927 | Fed. Rep. of Germany . |
| 1080350 | 4/1960 | Fed. Rep. of Germany . |
| 1503428 | 4/1969 | Fed. Rep. of Germany . |
| 1550254 | 7/1969 | Fed. Rep. of Germany . |
| 2426378 | 1/1975 | Fed. Rep. of Germany . |
| 940160 | 12/1948 | France . |
| 2100429 | 3/1972 | France . |
| 2366465 | 4/1978 | France . |
| 679079 | 9/1952 | United Kingdom . |
| 697495 | 9/1953 | United Kingdom . |
| 905661 | 8/1956 | United Kingdom . |
| 988894 | 4/1965 | United Kingdom . |
| 995929 | 6/1965 | United Kingdom . |
| 1015412 | 12/1965 | United Kingdom . |
| 1090740 | 11/1967 | United Kingdom . |
| 1199523 | 7/1970 | United Kingdom . |
| 1265497 | 3/1972 | United Kingdom . |
| 1350287 | 4/1974 | United Kingdom . |
| 1374783 | 11/1974 | United Kingdom . |

OTHER PUBLICATIONS

Excerpt from "Machine Design", (U.S.), vol. 42, p. 146, Nov. 12, 1970.
"A Look at Problem-Solving with Custom-Made Vespel ® Parts made by DuPont from High-Performance Engineering Resins".

Primary Examiner—Alan Cohan
Assistant Examiner—John A. Rivell
Attorney, Agent, or Firm—Harness, Dickey & Pierce

[57] ABSTRACT

An improved valve plate assembly is disclosed herein which incorporates a spring retainer which is press fitted into a suitable opening provided in the upper plate of a multiple piece valve plate assembly. The spring retainer element may be suitably designed for use with either coil or leaf type springs. An improved attachment arrangement for connecting the leaf spring to the valve member is also disclosed.

18 Claims, 4 Drawing Figures

U.S. PATENT DOCUMENTS

| | | | |
|---|---|---|---|
| 2,025,240 | 12/1935 | Higham | 137/454.4 |
| 2,062,816 | 12/1936 | Mercer | 137/512 |
| 2,193,243 | 3/1940 | Teeter | 417/569 |
| 2,349,137 | 5/1944 | Brown | 137/512.2 |
| 2,358,950 | 9/1944 | Trautman | 251/333 |
| 2,359,486 | 10/1944 | Magis | 137/454.4 |
| 2,366,004 | 12/1944 | Crittenden | 137/543.19 |
| 2,386,726 | 10/1945 | Tannehill | 137/540 |
| 2,579,667 | 12/1951 | Hanson | 137/512.2 |
| 2,848,157 | 8/1958 | Ayling | 137/512 |
| 2,900,999 | 8/1959 | Courtot | 137/516.25 |
| 2,930,401 | 3/1960 | Cowan | 137/543.21 |
| 2,949,929 | 8/1960 | Moore | 137/516.29 |
| 3,229,864 | 1/1966 | Roder | 417/566 |
| 3,309,013 | 3/1967 | Bauer | 137/512.3 |
| 3,332,437 | 7/1967 | Hallen | 137/516.29 |
| 3,378,030 | 4/1968 | Cary | 137/543.19 |
| 3,548,868 | 12/1970 | Mullaney | 137/543.13 |
| 3,664,371 | 5/1972 | Schneider | 137/543.19 |
| 3,770,009 | 11/1973 | Miller | 137/543.19 |
| 3,777,779 | 12/1973 | Schwaller | 137/512.3 |
| 3,889,710 | 6/1975 | Brost | 137/512.15 |
| 3,898,999 | 8/1975 | Haller | 137/512.1 |
| 3,944,381 | 3/1976 | Dirk | 417/564 |
| 3,999,898 | 12/1976 | Chomczyk | 137/512.1 |
| 4,032,266 | 6/1977 | Roeder | 137/512 |
| 4,049,017 | 9/1977 | Jones | 137/543.17 |
| 4,060,098 | 11/1977 | Bares et al. | 137/594 |
| 4,329,125 | 5/1982 | Chambers | 417/569 |

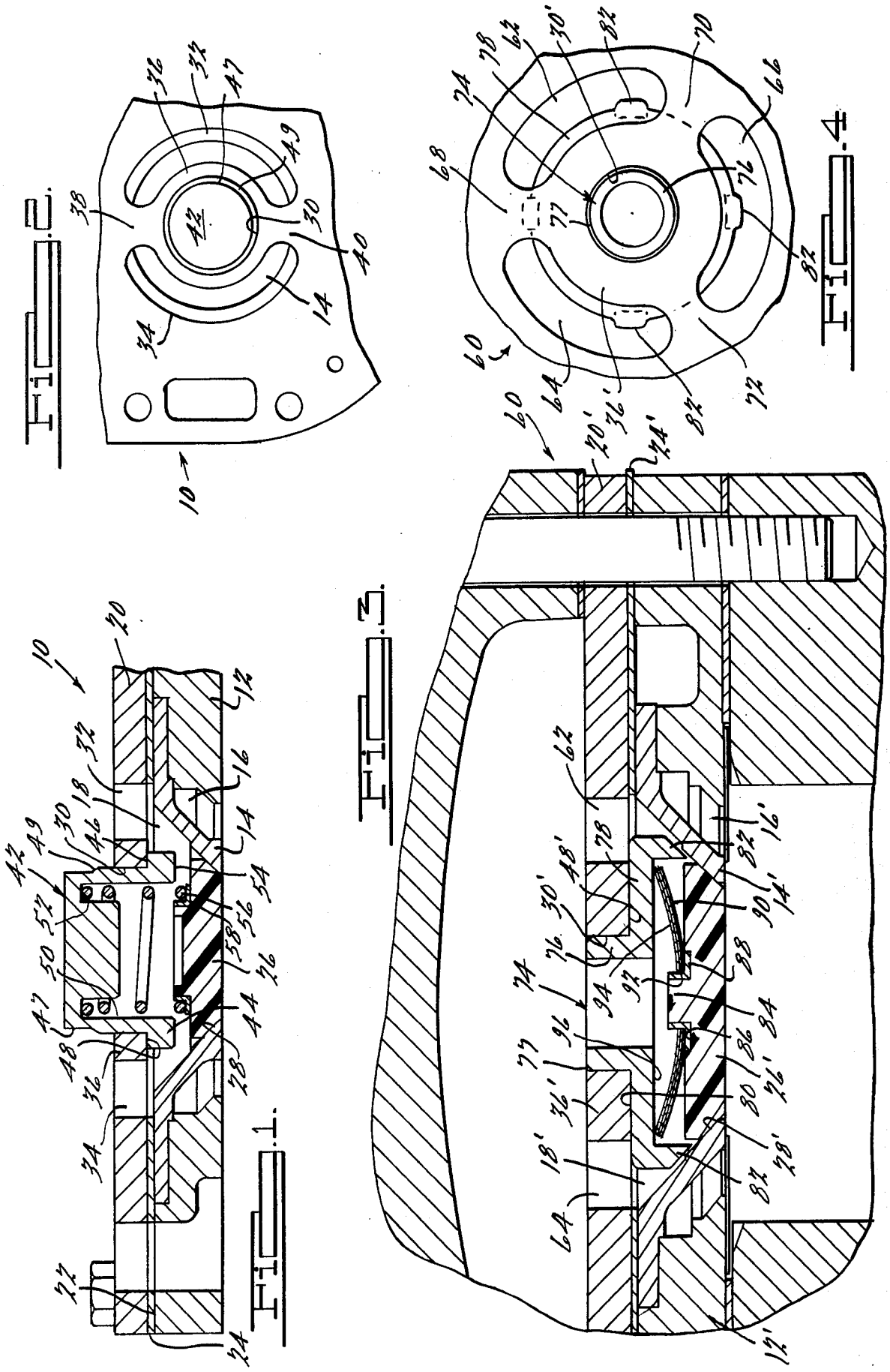

DISCHARGE VALVE GUIDE

BACKGROUND AND SUMMARY OF THE INVENTION

The present invention relates generally to valve plate assemblies for use in conjunction with compressors and more particularly with valve plate assemblies particularly adapted for use with refrigeration compressors which incorporate improved valve spring retaining means.

The present invention is particularly well suited for use with disc like lightweight compliant valves of the type described in detail in assignee's copending application Ser. No. 971,309, filed Dec. 20, 1978 and the valve plate assembly of assignee's copending application Ser. No. 114,346, filed Jan. 22, 1980 and represents an improvement over the spring guides and retainers described in assignee's copending application Ser. No. 114,345, filed Jan. 22, 1980 and Ser. No. 234,343 filed of even date herewith.

Valve plates and cylinder head assemblies can become relatively complex for certain valve arrangements and as a result may be quite costly to manufacture and/or assemble.

The present invention, however, provides an improved valve plate assembly incorporating a novel spring retainer arrangement which may be easily fabricated at relatively low cost and requires assembly of fewer parts. The spring retainer is designed to be press fitted within a suitably sized opening provided in the upper plate of a multiple piece valve plate assembly thereby eliminating the need for additional fasteners which could possibly vibrate loose. Additionally, the retainer members are designed so as to facilitate accurate positioning and alignment thereof with respect to the valve member and to enable relatively convenient selection of valve member preload and lift.

Additional advantages and features of the present invention will become apparent from the subsequent description and the appended claims taken in conjunction with the accompanying drawings.

BRIEF DESCRIPTION OF THE DRAWINGS

FIG. 1 is a fragmentary section view of a valve plate assembly in accordance with the present invention;

FIG. 2 is a fragmentary plan view of the valve plate assembly of FIG. 1 showing the discharge opening provided in the upper plate member thereof;

FIG. 3 is a fragmentary section view similar to that of FIG. 1, but showing another embodiment thereof; and FIG. 4 is a fragmentary view similar to that of FIG. 2, but showing the embodiment of FIG. 3.

DESCRIPTION OF THE PREFERRED EMBODIMENT

Referring now to the drawings and in particular to FIGS. 1 and 2 thereof, there is shown a valve plate assembly 10 in accordance with the present invention and comprising a valve plate 12 having a ring valve seat member 14 positioned within a generally conically shaped opening provided in valve plate 12 so as to define substantially concentric suction and discharge gas passages 16 and 18 respectively extending therethrough. A second plate member 20 is secured in position on the upper surface 22 of valve plate 12 with a suitable sealing gasket 24 disposed therebetween so as to isolate the suction and discharge gas passages 16 and 18.

The valve plate assembly 10 as described thus far is substantially identical to the valve plate assembly described in detail in assignee's copending application Ser. No. 114,346, except for the modification to upper plate member 20 as noted hereinafter.

A lightweight compliant polymeric discharge valve 26 is also provided seated against a valve seat 28 defined by the sidewall portion of ring member 14 which also defines discharge passage 18. Discharge valve 26 is preferably of the type described in detail in assignee's copending application Ser. No. 971,309.

As mentioned, upper plate member 20 is similar to the upper plate described in assignee's copending application Ser. No. 114,346, however, in place of the single relatively large diameter opening provided therein, plate member 20 of the present invention has a substantially smaller diameter opening 30 provided therein positioned substantially coaxially with discharge passage 18 and a pair of elongated arcuately shaped circumferentially spaced openings 32 and 34 spaced radially outwardly therefrom. Arcuate openings 32 and 34 and central opening 30 together define an annular flange portion 36 supported by radially extending portions 38 and 40 of plate member 20 disposed between respective opposed ends of arcuate openings 32 and 34.

A generally cylindrically shaped spring retainer member 42 is press fitted within central opening 30 of plate member 20 and includes a radially outwardly projecting annular flange portion 44 defining an upper shoulder 46 adapted to engage the lower surface 48 of flange portion 36 of upper plate member 20. Spring retainer 42 has an upper cylindrical poriton 47 of a slightly reduced diameter which is slightly less than the diameter of opening 30 and an inclined or conical shoulder portion 49 positioned therebelow both of which operate to facilitate the press fitting of retainer 42 into opening 30. Spring retainer 42 also has a central cylindrical spring guide bore 50 extending inwardly from the lower surface 54 thereof, the inner end 52 of which defines a hardened annular seat. The lower surface 54 of annular flange portion defines a continuous uninterrupted annular stop surface lying in a plane substantially parallel to valve member 26 and spaced therefrom a predetermined distance so as to limit the opening movement thereof. A compression coil spring 56 is seated in engagement with annular seat 52 and extends outwardly from bore 50 into engagement with a hardened annular steel seat 58 positioned on the upper surface of valve member 26 and operates to bias valve member 26 into a closed position as shown. Coil spring 56 and its interrelationship with the guide bore 50 and hardened seats 52 and 58 is more fully described in assignee's copending application Ser. No. 114,345. Preferably cylindrical spring retainer member 42 will be manufactured from powdered metal although other manufacturing methods may also be used.

In any event, the use of a press fitted spring retainer is substantially less expensive to manufacture and facilitates assembly in that it has a single generally cylindrical shape and does not require any separate fasteners to secure it in position. Additionally, because the retainer is press fitted inwardly into opening 30 of the upper plate member 20 from the lower surface 48 thereof, the action of coil spring 56 will assist in maintaining it in a properly seated position. Additionally, the possibility of an undesirable accumulation of tolerances is less than in other designs in that retainer 42 is located by engagement of shoulder 46 with the lower surface 48 of upper plate 20. Additionally, maximum valve lift can be easily controlled by merely controlling the thickness of annular flange portion 44 which in turn will adjust the relative position of the stop surface 54 provided thereon.

This press fit spring retainer arrangement is also well suited for use in conjunction with leaf springs of the bowed or curved disc type such as described in detail in assignee's copending application Ser. No. 234,343 filed on even date herewith. Such an embodiment indicated generally at 60 is shown in FIGS. 3 and 4 wherein like numbers primed have been used to indicate corresponding substantially identical parts of the valve assembly.

While the upper plate member 20 of the previous embodiment may be used in this embodiment, a further modification thereof is illustrated wherein the two discharge openings 32 and 34 are replaced by three similarly shaped elongate arcuate circumferentially spaced discharge passages 62, 64 and 66. Thus, central flange portion 36′ is supported by three radially extending flange portions 68, 70 and 72 positioned between opposed ends of openings 62, 64 and 66 and substantially equally spaced therearound.

In this embodiment, spring retainer 74 has a first cylindrically shaped hollow portion 76 of a suitable diameter to enable it to be press fitted within opening 30′ provided in upper plate member 20′. A slightly beveled or small conically shaped surface 77 is provided on the upper end of portion 76 to facilitate assembly thereof into opening 30′. A relatively large diameter radially outwardly extending annular flange portion 78 is also provided, the upper surface 80 of which engages the lower surface 48′ of the upper plate 20′ so as to locate spring retainer 74 relative thereto. A plurality of integrally formed guide fingers 82 are also provided spaced around the periphery of flange poriton 78 and extending downwardly into the discharge opening 18′ provided in valve plate member 12′.

In this embodiment, the upper or discharge passage facing surface of valve member 26′ is modified slightly to provide a central upwardly extending cylindrical protrusion 84 and a generally radially outwardly extending annular recess 86 therearound which is designed to accommodate and position an annular hardened steel seat member 88. Preferably recess 86 will be of a depth so as to position the radially extending spring engaging surface of seat member 88 in substantially coplanar relationship with the upper surface of valve member 26′.

A plurality of leaf springs 90 of the curved washer or disc type are also provided which are similar to those described in the aforementioned copending Ser. No. 234,343 application filed of even date herewith but are modified to provide a central hole 92 therein whereby they may be fitted onto the hardened seat with the upper concave surface 94 facing and engaging lower surface 96 of flange portion 78. The construction and operation of the guide fingers and leaf springs are otherwise substantially identical to that described in assignee's copending Ser. No. 234,343 application filed of even date herewith. However, it should be noted that because the leaf springs are fitted to the valve member they will also operate to retain the valve member in a properly centered relationship with respect to the guide fingers and to substantially prevent contact therebetween which could result in wearing of the sidewalls of the valve member or improper closing thereof. Additionally, it should be noted that lower surface 96 will also operate to provide a stop surface for limiting the maximum lift or opening movement of valve member. Again, the relative positioning of this surface may be easily controlled by varying the thickness of flange portion 78.

Thus, as is apparent from the foregoing, the present invention provides an improved valve plate assembly for use in compressors which includes a unique spring retainer arrangment which may be easily fabricated and assembled and is well suited for use with both coil and leaf type springs. Further, the press fit arrangement for securing the retainer assures more accurate and precise alignment of the spring retainer and the use of a locating flange engagement with the inner or lower surface of the plate reduces the possibility of an undesirable build up of tolerances.

It should be noted that the words "upper" and "lower" as used herein are intended to refer to the relative locations of the elements or portions thereof referred to as shown in the accompanying drawings and are not in any way to be considered as limiting the scope of the invention herein disclosed.

While it will be apparent the the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. In a valve plate assembly for use in a compressor, said compressor including a body defining a compression chamber and a separate head secured to said body and overlying said compression chamber, said valve plate assembly being positioned between said head and said body and including separately formed plate means having a discharge gas passage extending therethrough, means defining a valve seat therein, a valve member engageable with said valve seat and spring biasing means for biasing said valve member into a closed position wherein said valve member engages said valve seat, improved spring biasing retainer means comprising:

means defining an annular supporting flange on said plate means, said flange being positioned within said discharge gas passage and spring biasing retainer means supportingly positioned within and surrounded said annular supporting flange, said retainer means including a portion engageable with a surface portion of said flange facing said valve member to prevent movement of said retainer through said flange in a direction away from said valve member, said spring means extending between said retainer and said valve member so as to bias said valve member into a closed position.

2. A valve plate assembly as set forth in claim 1 wherein said spring retainer is press fitted within said flange.

3. A valve plate assembly as set forth in claim 1 said spring retainer includes a stop surface provided thereon positioned a predetermined distance from said valve member and operative to limit opening movement of said valve member.

4. A valve plate assembly as set forth in claim 1 wherein said plate means comprise a valve plate and a second plate member, said valve seat being provided in said valve plate and said flange being provided in said second plate.

5. In a valve plate assembly for use in a compressor and including a valve plate having a discharge gas passage extending therethrough, means defining a valve seat therein, a valve member engageable with said valve seat, a second plate member, including a plurality of arcuate spaced discharge passages and spring biasing means for biasing said valve member into a closed position wherein said valve member engages said valve seat, improved spring biasing retainer means comprising:

an opening in said second plate member overlying said discharge gas passage, said arcuate spaced discharge passages being spaced outwardly from said opening and defining an annular flange portion, said opening extending through said flange portion and spring biasing retainer means supportingly positioned within said opening, said spring means extending between said retainer and said valve member so as to bias said valve member into a closed position.

6. A valve plate assembly as set forth in claim 1 wherein said spring means is a coil spring and said retainer means has a guide bore provided therein, one end of said coil spring being seated within said guide bore.

7. A valve plate assembly as set forth in claim 1 wherein said spring means comprises a plurality of leaf springs.

8. A valve plate assembly for use in a compressor comprising:

a valve plate having means defining concentric suction and discharge passages;
a valve seat;
a valve member movably seated on said valve seat;
a second plater overlying said discharge passage in said valve plate and having a central opening therein and a plurality of spaced dishcharge passages spaced radially outwardly from said opening, said central opening and said plurality of discharge passges opening into said discharge passage in said valve plate;
retainer means frictionally fitted and supported within said opening, said retainer means including means engageable with a portion of said second plate to inhibit movement of said retainer in a direction away from said valve member, said retainer means defining a spring seat; and
spring means extending between said spring seat and said valve member, said spring means being operative to bias said valve member into a closed position.

9. A valve plate assembly as set forth in claim 8 wherein said retainer means includes a stop surface positioned a predetermined distance from said valve member and operative to limit opening movement thereof.

10. A valve plate assembly as set forth in claim 9 wherein said stop surface is provided on an annular flange portion, said flange portion engaging a valve member facing surface of said second plate member.

11. A valve plate assembly as set forth in claim 10 wherein said spring means comprises a plurality of leaf springs.

12. A valve plate assembly as set forth in claim 11 wherein each of said leaf springs include a central opening therethrough and said valve member has a projection provided thereon receivable within said central opening in said leaf springs and cooperating therewith to position said valve member during movement thereof.

13. A valve plate assembly as set forth in claim 12 wherein said projection comprises a steel seat member provided on said valve member and engaging said leaf springs.

14. An improved valve plate assembly for use in a compressor comprising:

a valve plate means having a discharge opening extending therethrough and means defining a valve seat in said discharge opening;
leaf spring biasing means having a convex surface and a concave surface;
a valve member engageable with said valve seat to close said discharge opening and including a spring seat, said spring seat engaging a portion of said convex surface of said leaf spring; and
retainer means secured to said valve plate means and including means engaging said valve plate means to prevent movement of said retainer means in a direction away from said valve member, said retainer means engaging a portion of said concave surface of said leaf spring so as to bias said valve member into said closed position.

15. A valve plate assembly as set forth in claim 14 wherein said leaf spring means have a central opening extending therethrough and said spring seat includes means projecting into said opening whereby said leaf spring may operate to restrain lateral movement of said valve member.

16. A valve plate assembly as set forth in claim 15 wherein said spring seat comprises a projection integrally formed with said valve member and an annular seat member fitted on said projection, said seat member engaging said leaf spring.

17. An improved valve plate assembly for use in a compressor comprising:

a valve plate means having a discharge opening extending therethrough and means defining a valve seat in said discharge opening;
leaf spring biasing means having a convex surface and a concave surface and a central opening extending therethrough;
a valve member engageable with said valve seat to close said discharge opening and including a spring seat comprising a projection integrally formed with said valve member and an annular seat member fitted on said projection, said seat member projecting into said opening in said leaf spring means whereby said leaf spring may operate to restrain lateral movement of said valve member, said spring seat engaging a portion of said convex surface of said leaf spring; and
retainer means secured to said valve plate means including a cylindrical flange portion engageable with a concave portion of said leaf spring so as to bias said valve member into said closed position and a plurality of radially outwardly spaced depending guide fingers extending into said discharge passage, said guide fingers operating to restrict lateral movement of said leaf spring and said leaf spring being operative to prevent engagement of said valve member with said guide fingers.

18. A valve plate assembly as set forth in claim 14 wherein said compressor includes a body defining a compression chamber and a head secured to said body and overlying said compression chamber, said valve plate means being secured between said head and said body.

* * * * *

UNITED STATES PATENT AND TRADEMARK OFFICE
CERTIFICATE OF CORRECTION

PATENT NO. : 4,450,860

DATED : May 29, 1984

INVENTOR(S) : Woodie R. Francis and James F. Fogt

It is certified that error appears in the above-identified patent and that said Letters Patent is hereby corrected as shown below:

Column 3, line 18, "elongate" should be -- elongated --.

Column 3, line 36, "poriton" should be -- portion --.

Column 4, line 49, after "surrounded" insert -- by --.

Column 5, line 34, "plater" should be -- plate --.

Column 5, line 36, "dishcharge" should be -- discharge --.

Column 6, line 14, "porition" should be -- portion --.

Signed and Sealed this

Sixth Day of November 1984

[SEAL]

Attest:

GERALD J. MOSSINGHOFF

Attesting Officer

Commissioner of Patents and Trademarks